(12) United States Patent
Petzl et al.

(10) Patent No.: US 7,320,159 B2
(45) Date of Patent: Jan. 22, 2008

(54) KARABINER WITH LOCKING RING

(75) Inventors: Paul Petzl, Barraux (FR); Pierre Plaze, Chambery (FR)

(73) Assignee: Zedel, Crolles (FR)

( * ) Notice: Subject to any disclaimer, the term of this patent is extended or adjusted under 35 U.S.C. 154(b) by 16 days.

(21) Appl. No.: 11/372,260

(22) Filed: Mar. 10, 2006

(65) Prior Publication Data
US 2006/0207073 A1    Sep. 21, 2006

(30) Foreign Application Priority Data
Mar. 17, 2005    (FR)    ................... 05 02628

(51) Int. Cl.
F16B 45/02    (2006.01)
F16B 45/00    (2006.01)

(52) U.S. Cl. ................... 24/599.5; 24/600.2

(58) Field of Classification Search ............... 24/601.1, 24/600.2, 599.5, 599.3, 598.2; 294/82.21, 294/82.2, 82.23
See application file for complete search history.

(56) References Cited

U.S. PATENT DOCUMENTS

| 1,886,726 | A | * | 11/1932 | Pennefather ............... 24/600.4 |
|---|---|---|---|---|
| 5,287,645 | A | | 2/1994 | Gois |
| 5,505,013 | A | * | 4/1996 | Gois ............................. 43/14 |
| 5,608,953 | A | * | 3/1997 | Petzl et al. ................. 24/588.1 |
| 5,791,025 | A | | 8/1998 | Maurice et al. |
| 6,227,015 | B1 | * | 5/2001 | Luquire ......................... 70/18 |
| 6,588,076 | B1 | * | 7/2003 | Choate ....................... 24/600.2 |
| 2003/0167608 | A1 | * | 9/2003 | Petzl et al. ................. 24/600.2 |

FOREIGN PATENT DOCUMENTS

| EP | 0 376 860 A1 | 7/1990 |
|---|---|---|
| EP | 0 826 890 A1 | 3/1998 |

* cited by examiner

Primary Examiner—Robert J. Sandy
(74) Attorney, Agent, or Firm—Oliff & Berridge, PLC

(57) ABSTRACT

A safety karabiner comprises a swivelling gate with a sliding locking ring operating in conjunction with a lock-bolt. The ring comprises a hole for receiving the lock-bolt at the end of the translation travel to the first locked position to constitute both a mechanical blocking device of the ring and a first visual indicator indicating the locked state. The lock-bolt is fitted on the movable gate.

5 Claims, 4 Drawing Sheets

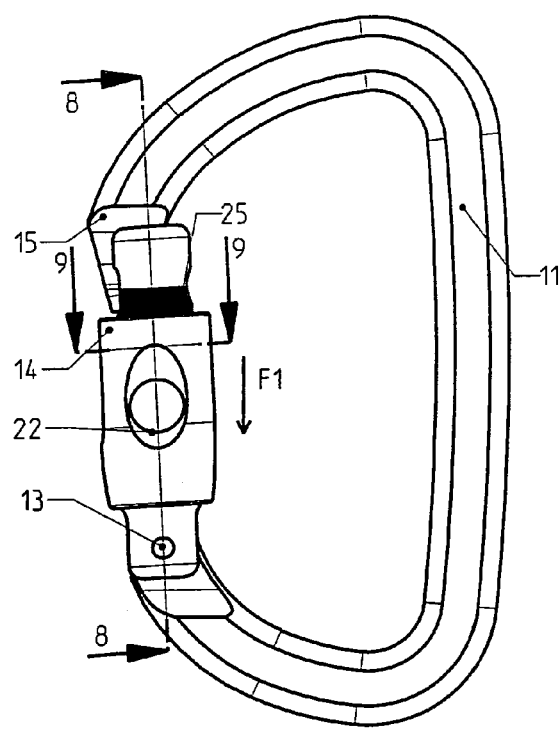
FIG 7
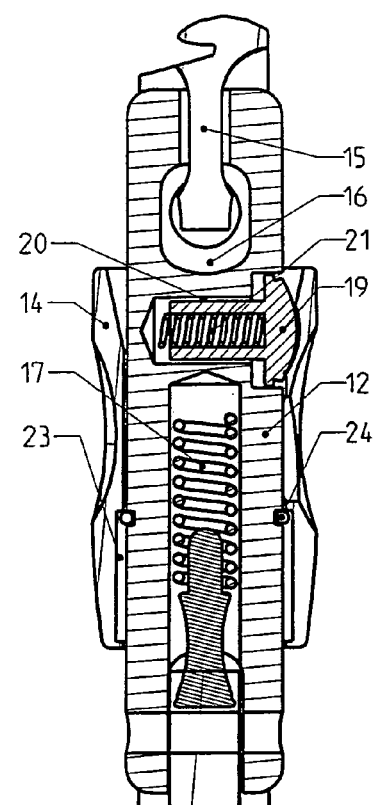
FIG 8
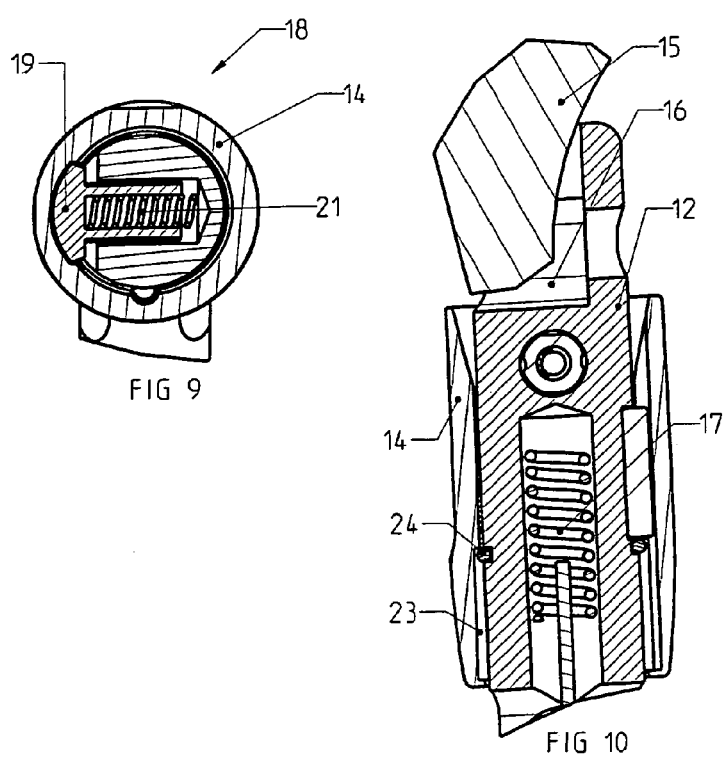
FIG 9
FIG 10
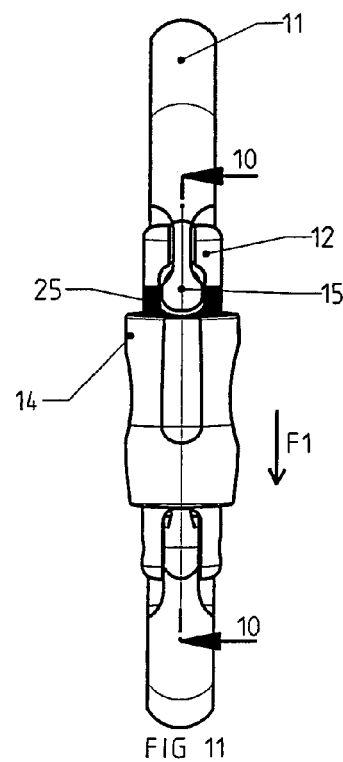
FIG 11

KARABINER WITH LOCKING RING

BACKGROUND OF THE INVENTION

The invention relates to a karabiner comprising a fixed C-shaped body having a first end shaped as a securing part and a second end for articulation of a gate movable around a pivoting spindle between a closed position and an open position, said gate comprising:
- a latching part situated opposite the pivoting spindle to operate in conjunction with the securing part in the closed position,
- a return spring to return the gate to the closed position,
- a locking ring fitted coaxially around the gate and having a shorter length than that of the gate, said ring being movable between a first locked position blocking the gate in the closed position and a second unlocked position enabling the gate to be moved to the open position,
- and a lock-bolt able to block the ring positively in said first locked position.

STATE OF THE ART

Known karabiners equipped with locking rings of the kind referred to generally use screw-type or bayonet-type fastening rings. In the case of screw-type fastening rings, going from the second unlocked position to the first locked position requires the ring to be screwed through several turns to move it in translation along the gate over a travel of several millimeters so as to efficiently cover the securing part of the body. This screw-tightening operation is tedious and takes a relatively long time to perform. The same drawback arises when unscrewing to make the ring go from the first locked position to the second unlocked position. In the case of a bayonet-fastening ring, blocking of the gate in the closed position is achieved by a first upward translational movement of the ring against the force of a spring, followed by a second limited rotational movement. After it has been released, the ring undergoes a slight recoil movement, and is kept in the first blocking position by the elastic force of the spring. Inadvertent unlocking of the ring does however still remain possible in the presence of friction forces exerted by the rope.

The document EP 826,890 describes a karabiner with a locking ring that is mounted rotating around the swivelling gate. A ball-lock is integral to the gate and operates in conjunction with the rotating ring to perform positive locking of the karabiner in the closed position when the ring is actuated at the end of travel. Manual movement of the ring in rotation from the first locked position to the second unlocked position can only take place after the lock has been previously neutralized. Opening the gate of a locked karabiner therefore requires a first lock releasing command, a second rotational movement of the ring to the second unlocked position, and a third pivoting movement of the gate to the open position. The second rotational movement to unlock the ring lengthens the opening sequence and complicates handling of the karabiner.

The document EP 376,860 describes a karabiner having a gate locking ring position indicator. The device does not however have a lock performing positive locking of the ring.

The document U.S. Pat. No. 5,287,645 refers to a ring with a sliding locking ring operating in conjunction with a telescopic pin that is integral to the fixed body. Manual releasing of the lock must be performed beforehand to be able to actuate the ring to the unlocked position or the locked position. Such a command complicates handling for fitting the ring.

OBJECT OF THE INVENTION

The object of the invention consists in providing a safety karabiner with positive locking of the gate enabling handling to be improved.

The karabiner according to the invention is characterized in that the lock-bolt is placed on the movable gate and the locking ring is slidingly mounted on the gate between the first and second positions, said ring comprising a hole for receiving the lock-bolt at the end of the translation travel to the first locked position to constitute both a mechanical blocking device of the ring and a first visual indicator indicating the locked state.

Manual unlocking of the lock-bolt and actuation of the ring in translation to the unlocked position are performed quickly by a single action of the climber.

According to a preferred embodiment, the lock-bolt is placed on one of the side faces of the gate, being angularly offset by 90° with respect to the locking part. The lock-bolt comprises a telescopic pin fitted in a hole of the gate with a compression spring fitted therebetween, the pin having a colored surface to form said first visual indicator in the locked state.

At the level of the locking part, the periphery of the gate can comprise a second visual indicator visible in the unlocked state of the ring and invisible in the locked state.

The locking ring can be made from metal or plastic.

BRIEF DESCRIPTION OF THE DRAWINGS

Other advantages and features of the invention will become more clearly apparent from the following description, given for non-restrictive example purposes only, and represented in the accompanying drawings in which:

FIG. 7 shows an identical view to FIG. 3, the gate being closed and the ring unlocked;

FIG. 8 is a cross-sectional view along the line 8-8 of FIG. 7;

FIG. 9 is a cross-sectional view along the line 9-9 of FIG. 7;

FIG. 10 is a cross-sectional view along the line 10-10 of FIG. 11;

FIG. 11 is a side view of FIG. 7;

DESCRIPTION OF A PREFERRED EMBODIMENT OF THE INVENTION

Figure 1:
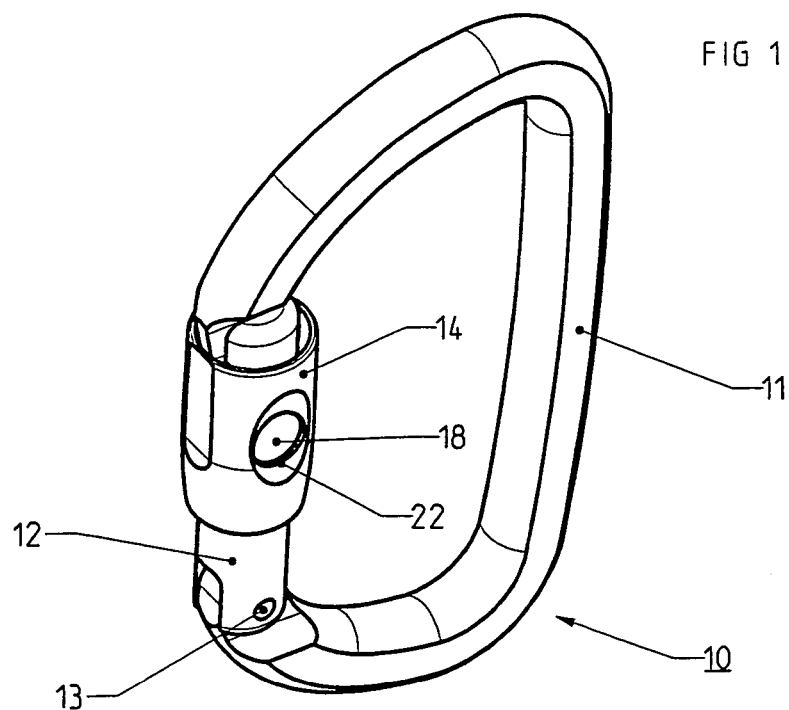
FIG. 1 is a perspective view of the karabiner according to the invention, the gate being closed and locked by the locking ring.
Figure 2:
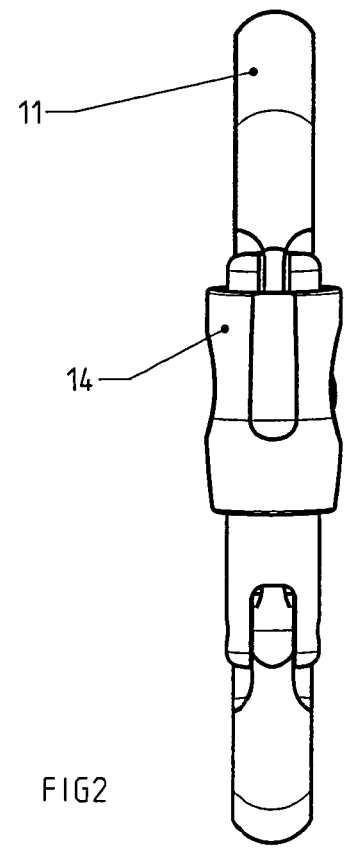
FIG. 2 is a side view of FIG. 1.

In the figures, a karabiner 10 for climbing and mountaineering comprises a C-shaped metal body 11 and a movable gate 12 mounted swivelling on a spindle 13 situated at the bottom end of the body 11. The movable gate 12 is equipped with a coaxial locking ring 14 slidingly mounted on the gate 12 between a first locked position (FIGS. 1 to 6) and a second unlocked position (FIGS. 7 to 13).

In the unlocked position of the ring 14, the gate 12 is able to be moved towards the inside of the body 11 allowing the karabiner to be opened (FIG. 12) to enable either a rope or a strap to be inserted or the karabiner to be hooked onto a securing device (not shown).

The top end of the body 11 is provided with a male securing part 15 able to engage in a female latching part 16 of the gate 12 when it is returned to the closed position (FIG. 7) by the action of a return spring 17. The male securing part 15 presents for example a reverse T-shaped structure comprising a tab extended by a protuberance in the form of a cap. The female latching part 16 of the gate 12 is situated opposite the pivoting spindle 13 and comprises a recess of conjugate shape to the male part 15. The sliding locking ring 14 is of shorter length than the gate 12.

In the locked position, the top part of the ring 14 is facing the protuberance of the male part 15 (FIG. 6), which prevents any inward pivoting of the gate 12 when a pushing action is exerted perpendicularly to the longitudinal direction of the ring 14.

When the ring 14 is actuated manually in downward translation (arrow F1, FIGS. 10 and 11) in the direction of the unlocked position, the top part of the ring 14 releases the protuberance of the male part 15. Opening of the gate 12 is then possible by a pushing action making the gate 12 swivel around the spindle 13 to the open position of FIG. 12.

Figure 3:
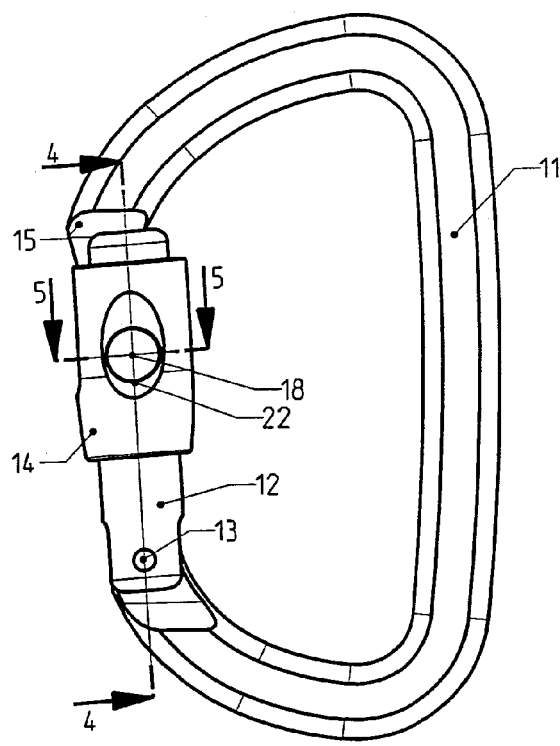
FIG. 3 shows an elevational view of FIG. 1.
Figure 4:
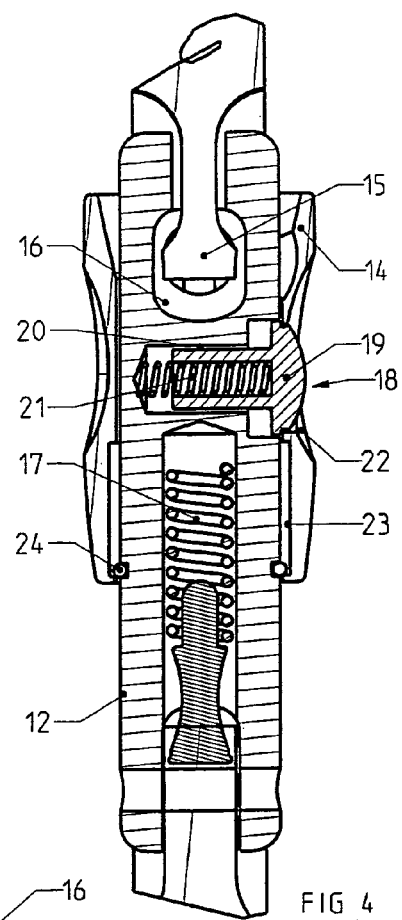
FIG. 4 is a cross-sectional view along the line 4-4 of FIG. 3.
Figure 5:
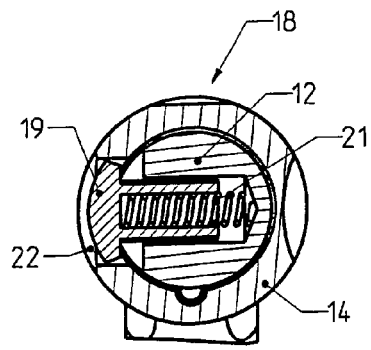
FIG. 5 is a cross-sectional view along the line 5-5 of FIG. 3.
Figure 6:
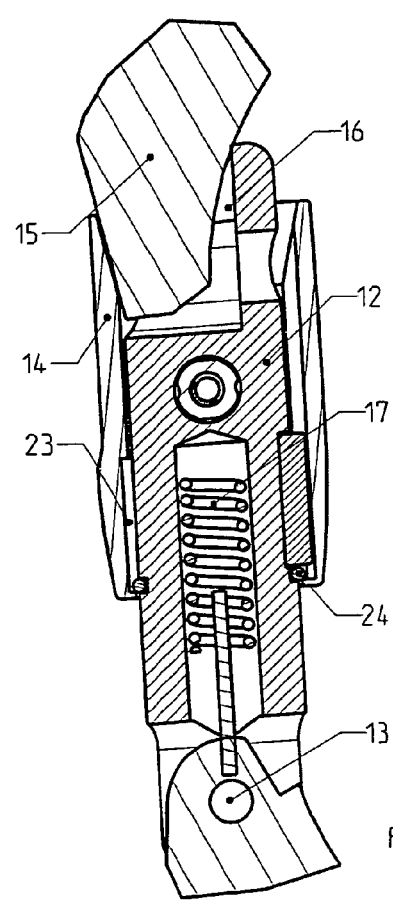
FIG. 6 represents a vertical cross-section of the gate in the closed and locked position of FIG. 1.

The movable gate 12 is in addition equipped with a lock-bolt 18 designed to block the ring 14 positively in the locked position (FIGS. 3 to 5). The lock-bolt 18 comprises a telescopic pin 19 housed in a radial aperture 20 of the gate 12 with a compression spring 21 fitted therebetween. The locking ring 14 is provided with a circular hole 22 wherein the pin 19 engages when the ring reaches the first locked position. In this positive locking position, actuation of the ring 14 in translation to the second unlocked position is rendered impossible, and the gate 12 remains closed with total safety, regardless of any force being exerted on the gate 12. The hole 22 for passage of the pin 19 is situated at the bottom of a gripping surface in the form of a bowl, which facilitates the depressing action of the lock-bolt 18 for the ring 14 to move to the unlocked position. The pin 19 of the lock-bolt 18 is advantageously placed on one of the side faces of the gate 12, being angularly offset by 90° with respect to the female latching part 16. Such an arrangement facilitates unlocking of the lock-bolt 18 and control operation of the ring 14.

The convex surface of the pin 19 is advantageously colored, for example green, so as to provide a first visual indicator indicating the locked state of the ring 14 (FIGS. 4 and 5). In the other, unlocked, state, this first mark is not visible, as the pin 19 is hidden by the ring 14 (FIGS. 8 and 9).

A second visual indicator 25 can be arranged around the periphery of the gate 12 at the level of the female latching part 16. It is formed by a colored coating, for example red, that is respectively visible in the unlocked state of the ring 14 and invisible in the locked state.

The translational travel of the ring 14 is limited along the gate 12. It corresponds to the length of an annular groove 23 arranged inside the ring 14, and operating in conjunction with a stop 24 integral to the gate 12. The stop 24 can be formed by a retaining clip or any other stopping means.

The locking ring 14 can be made of metal or plastic.

Operation of the karabiner 10 according to FIGS. 1 to 13 is as follows:

In the closed locked position of the gate 12 (FIGS. 1 to 6), the lock-bolt 18 is engaged and blocks the locking ring 14 positively in the first locked position which is stable. The top part of the ring 14 is up against the stop formed the fixed male securing part 15. It prevents any pivoting movement of the gate 12 towards the inside of the body 11. The spring 21 keeps the pin 19 of the lock-bolt 18 in the hole 22 of the ring 14, and the green first indicator visually indicates the locked state.

FIGS. 7 to 11 illustrate the closed unlocked position of the gate 12 following translational movement (arrow F1, FIG. 11) of the ring 14 to the unlocked position. This downward translation of the ring 14 requires prior manual unlocking of the lock-bolt 18 which is performed by a depression action of the pin 19 against the return force of the compression spring 21. At the end of the unlocking travel of the ring 14, the pin 19 disappears only leaving the empty hole 22 of the ring 14 apparent. This unlocking position of the ring 14 is also stable and is confirmed by the appearance of the red second indicator 25.

Figure 12:
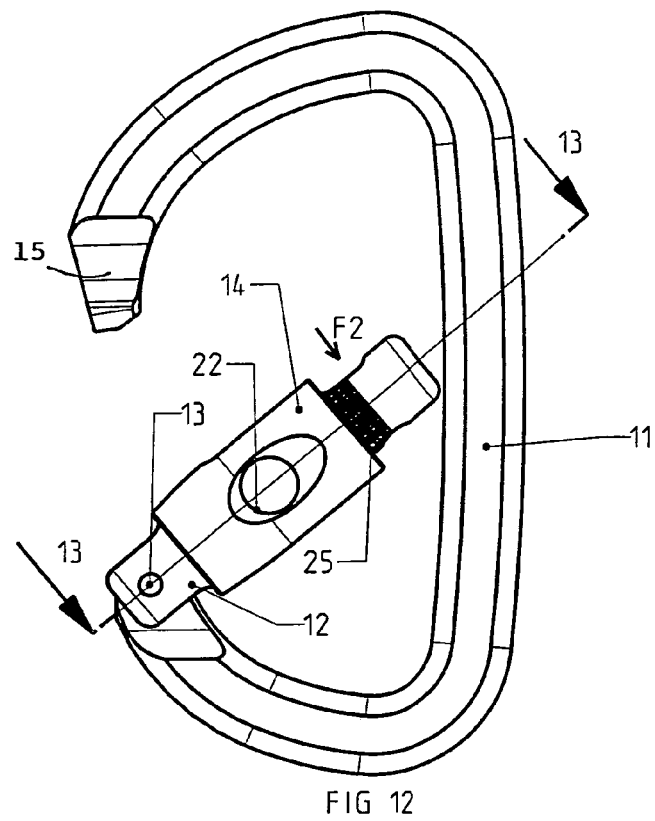
FIG. 12 shows an identical view to FIG. 7, the gate being open and the ring unlocked.
Figure 13:
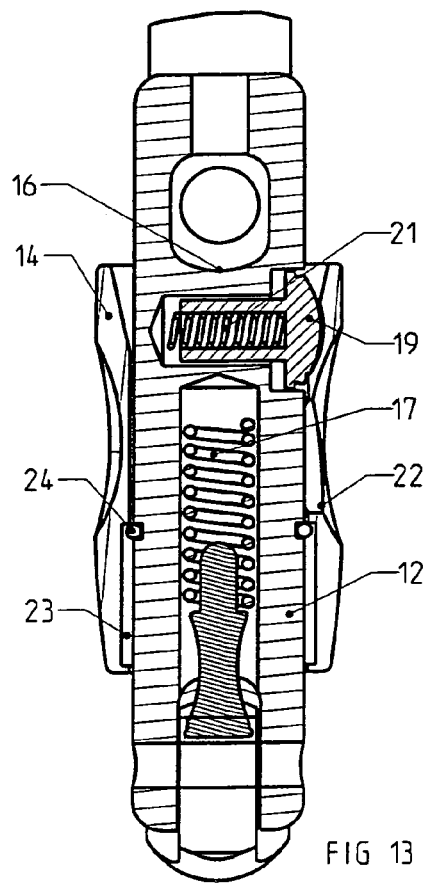
FIG. 13 is a cross-sectional view along the line 13-13 of FIG. 12.

With reference to FIGS. 12 and 13, it is now possible to make the gate 12 swivel (arrow F2) to the open position. The ring 14 remains immobilized in the unlocking position and the red second indicator 25 remains visible.

After the opening force has been released, the return spring 17 automatically urges the movable gate 12 back to the closed unlocked position (FIG. 7) and the lock-bolt 18 is not engaged. Moving to the closed position locked (FIGS. 3 to 6) then requires an upward manual translation movement of the locking ring 14 causing the pin 19 to be inserted in the hole 22 of the ring 14 at the end of travel.

The invention claimed is:

1. A karabiner comprising a fixed C-shaped body having a first end shaped as a securing part and a second end for articulation of a gate movable around a pivoting spindle between a closed position and an open position, said gate comprising:

a latching part situated opposite the pivoting spindle to operate in conjunction with the securing part in the closed position, a return spring to return the gate to the closed position, a locking ring fitted coaxially around the gate and having a shorter length than that of the gate, said ring being movable between a first locked position blocking the gate in the closed position and a second unlocked position enabling the gate to be moved to the open position, and a lock-bolt able to block the ring positively in said first locked position, wherein the lock-bolt is placed on the movable gate and the locking ring is slidingly mounted on the gate between the first and second positions, said ring comprising a hole for receiving the lock-bolt at the end of the translational travel to the first locked position to constitute both a mechanical blocking device of the ring and a first visual indicator indicating the locked state, and wherein the lock-bolt comprises a telescopic pin fitted in a hole of the gate with a compression spring fitted therebetween, the pin having a colored surface to form said first visual indicator in the locked state.

2. The karabiner according to claim 1, wherein the lockbolt is placed on one of the side faces of the movable gate, being angularly offset with respect to the latching part.

3. The karabiner according to claim 1, wherein the locking ring is made of metal.

4. The karabiner according to claim 1, wherein the locking ring is made of plastic.

5. The karabiner according to claim 1, wherein the periphery of the gate at the level of the latching part comprises a second visual indicator visible in the unlocked state of the ring and invisible in the locked state.

* * * * *